United States Patent [19]
Wilkes et al.

[11] Patent Number: 5,993,706
[45] Date of Patent: Nov. 30, 1999

[54] OXYGENATED HYDROCARBON COMPATIBILIZING AGENT FOR CARBON DIOXIDE-BLOWN POLYOLEFINIC FOAMS

[75] Inventors: Gary R. Wilkes, Saratoga Springs; Kim A. Bly, Queensbury; Harris A. Dunbar, Corinth, all of N.Y.; Eugene R. Uhl, Russell, Ky.; James L. Zwynenburg, Queensbury, N.Y.

[73] Assignee: Tenneco Protective Packaging, Inc., Glens Falls, N.Y.

[21] Appl. No.: 08/874,572

[22] Filed: Jun. 13, 1997

Related U.S. Application Data

[63] Continuation-in-part of application No. 08/694,298, Aug. 8, 1996, Pat. No. 5,698,144, and a continuation-in-part of application No. 08/746,825, Nov. 18, 1996, Pat. No. 5,817, 705, which is a continuation-in-part of application No. 08/735,271, Oct. 22, 1996, abandoned, which is a continuation-in-part of application No. 08/730,177, Oct. 15, 1996, abandoned.

[51] Int. Cl.$^6$ ..................................................... B29C 44/20
[52] U.S. Cl. ........................ 264/50; 264/53; 264/DIG. 5; 521/97
[58] Field of Search .......................... 264/50, 51, DIG. 5, 264/53; 521/97

[56] References Cited

U.S. PATENT DOCUMENTS

| | | |
|---|---|---|
| 4,217,319 | 8/1980 | Komori . |
| 4,323,528 | 4/1982 | Collins . |
| 4,486,550 | 12/1984 | Rhoads . |
| 4,569,950 | 2/1986 | Hoshi et al. . |
| 5,034,171 | 7/1991 | Kiczek et al. . |
| 5,059,376 | 10/1991 | Pontiff et al. . |
| 5,116,881 | 5/1992 | Park et al. . |
| 5,149,579 | 9/1992 | Park et al. . |
| 5,180,751 | 1/1993 | Park et al. . |
| 5,189,071 | 2/1993 | Rhoads et al. . |
| 5,189,072 | 2/1993 | Rhoads et al. . |
| 5,225,451 | 7/1993 | Rogers et al. . |
| 5,229,429 | 7/1993 | Hahn et al. . |
| 5,258,415 | 11/1993 | Hahn et al. . |
| 5,290,822 | 3/1994 | Rogers et al. . |
| 5,348,984 | 9/1994 | Lee . |
| 5,416,129 | 5/1995 | Chaudhary et al. . |
| 5,462,974 | 10/1995 | Lee . |
| 5,527,573 | 6/1996 | Park et al. .......................... 428/314.8 |
| 5,554,661 | 9/1996 | Chaudhary et al. . |
| 5,567,742 | 10/1996 | Park . |
| 5,698,144 | 12/1997 | Wilkes et al. .............................. 264/50 |

*Primary Examiner*—Allan R. Kuhns
*Attorney, Agent, or Firm*—Arnold White & Durkee

[57] ABSTRACT

A method of making a polyolefinic foam composition comprising the steps of:

(a) feeding a polyolefinic polymer into an extruder;
(b) adding a nucleating agent to the resin feed;
(c) optionally adding a permeation modifier to the resin feed;
(d) plasticating the mixture in an extruder to form a polymeric melt;
(e) incorporating a blowing agent of carbon dioxide and optionally one or more members selected from the group consisting of inorganic blowing agents, organic blowing agents, and combinations thereof;
(f) incorporating at least one compatibilizing agent into said foamable composition wherein said compatibilizing agent is an oxygenated hydrocarbon that decreases the minimum pressure required to prevent prefoaming while retarding the collapse of foam due to excessive blowing agent migration;
(g) uniformly mixing and cooling the foamable composition to a temperature effective for the expansion of the polyolefinic foam; and
(h) extruding or ejecting the foamable composition through a die to form a polyolefinic foam.

14 Claims, No Drawings

OXYGENATED HYDROCARBON COMPATIBILIZING AGENT FOR CARBON DIOXIDE-BLOWN POLYOLEFINIC FOAMS

FIELD OF THE INVENTION

This is a continuation-in part of U.S. Ser. No. 08/694,298, inventors: Wilkes et al., entitled: Process for Producing Low Density Polyethylenic Foam with Atmospheric Gases and Polyglycols or Polyglycol Ethers, filed on Aug. 8, 1996, now U.S. Pat. No. 5,698,144, and a continuation-in-part of U.S. Ser. No. 08/746,825, inventors: Wilkes et al., entitled: A Short Time Frame Process For Producing Extruded Closed Cell Low Density Propylene Polymer Foams, filed on Nov. 18, 1996, now U.S. Pat. No. 5,817,705, which is a continuation-in-part of U.S. Ser. No. 08/735,271, now abandoned, having the same inventors and title, filed on Oct. 22, 1996, which is a continuation-in-part of U.S. Ser. No. 08/730,177, now abandoned, having the same inventors and title, filed on Oct. 15, 1996.

This invention relates, in general, to a process and a composition for manufacture of a foamed thermoplastic material. More specifically, it relates to processes and extrudable compositions for production of low-density uncrosslinked polyolefinic foams when using carbon dioxide as a blowing agent or in combination with an auxiliary organic or inorganic physical blowing agent by adding certain oxygenated hydrocarbons as a compatibilizing agent.

BACKGROUND OF THE INVENTION

Low-density thermoplastic foams, particularly those having a density of less than about 150 $kg/m^3$, are generally produced with physical blowing agents. Physical blowing agents are chemical compounds which can be incorporated into the thermoplastic melt while within the extruders at high pressures, typically 10–20 MPa, and which can be contained by the polymer structure when the cooled thermoplastic/blowing agent mixture is rapidly reduced to ambient pressure. Polyolefinic foams, in particular, uncrosslinked polyethylene foam and uncrosslinked polypropylene foam, were manufactured for many years with halogenated hydrocarbons, primarily chlorofluorocarbons (CFC's) as physical blowing agents.

During the 1980's the worldwide scientific community presented sufficient evidence to link CFC's with atmospheric ozone depletion and sought for world governments to regulate CFC's. Ozone levels in the stratosphere have been shown to be significant in protecting life on the planet from the damaging effects of ultraviolet radiation from the sun. Additionally, hydrochlorofluorocarbons (HCFC's), another class of chemical compounds were also included in the regulations but on a more lengthy schedule. It was established that the higher atomic weight halogen compounds other than fluorine that were responsible for this effect.

As a result of the regulations, it became necessary to find materials other than halogenated compounds which could function as physical blowing agents. Many different approaches were taken, but generally in the direction of the use of hydrocarbons containing from two to five carbons or blends thereof. Although these short-chained hydrocarbons may function as physical blowing agents to produce foams with satisfactory physical properties, these physical blowing agents are highly flammable. U.S. Pat. No. 4,217,319 (Komori) discusses a process for producing polyolefin foams with various volatile organic compounds as the physical blowing agent. U.S. Pat. No. 5,290,822 (Rogers et al) and U.S. Pat. No. 5,225,451 (Rogers et al) discuss processes for ultra-low density foam using polymer blends. U.S. Pat. No. 5,059,376 (Pontiff) discusses a process to remove residual hydrocarbons in the attempt to produce a non-flammable polyethylene foam.

Carbon dioxide, alone or in combination with various other gases, has been used as a blowing agent to produce polyethylene foam. U.S. Pat. No. 5,034,171 (Kiczek et al) discusses an extrusion process for producing a "microcellular" thermoplastic foam and cites polyethylene as possible polymer and carbon dioxide as a possible inert gas foaming agent. U.S. Pat. No. 5,462,974(Lee) discusses a foamable polyethylene resin composition having a blowing agent comprised of a blend of about 50% by weight of carbon dioxide and about 50% by weight of either normal butane, isobutane, propane, ethane, or a mixture of any combination of these hydrocarbons, in mixture with the resin in a ratio of about one part blowing agent to about 10 parts resin while using a zinc oxide nucleation agent and a glycerol monostearate aging modifier. U.S. Pat. No. 5,416,129 (Chaudhary et al.) and U.S. Pat. No. 5,554,661 (Chaudhary et al.) discuss a process and composition for preparing uncrosslinked ethylenic polymer foam using a polymer of a defined melt tension with either argon, carbon dioxide, or blends thereof. These patents generally state that argon and carbon dioxide, alone or in blends, can function as a physical blowing agent with ethylenic materials having a specific melt tension.

U.S. Pat. No. 5,116,881 (Park et al.), U.S. Pat. No. 5,149,579 (Park et al.), and U.S. Pat. No. 5,180,751 (Park et al.) discuss a process and a composition for producing thermoformable polypropylene foam sheets from high melt strength polypropylene and refer to carbon dioxide as a potential blowing agent. The patent discusses foam sheets in the range of densities above 2.5 $lb/ft^3$ (42 $kg/m^3$) with sheet thicknesses below 0.200 inch (5.0 mm) which are defined by certain physical properties. U.S. Pat. No. 5,567,742 (Park) discusses a dimensionally stable polypropylene foam with an inorganic blowing agent. While applicable to both open and closed cell foams, the discussed process with inorganic blowing agents is limited to combinations of cell sizes and densities which result in cell wall thicknesses within a specified range.

When used as physical blowing agents in traditional low density polyolefinic foam processes, carbon dioxide either alone or in combination with other gases including water generally produce non-descript masses of polymeric material or otherwise poor quality thermoplastic foams which collapse. This lack of dimensional stability occurs because of the limited solubility for these compounds within the molten thermoplastic extrudate which results in an uncontrollable high level of open cells in the foam structure as the thermoplastic/blowing agent combination exits the die. Additionally, even if the resultant thermoplastic materials which are made with carbon dioxide as the primary blowing agent have a visible foam structure, most of such foams tend to collapse quickly in time and become useless for most practical applications in less than 24 hours after manufacture. Accordingly, in order to use carbon dioxide as the primary blowing agent, it is necessary to reduce the pre-foaming pressure required to make a foam at the die and subsequently either eliminate or significantly reduce the rate of collapse normally exhibited by polyolefinic foam made with carbon dioxide, water or blends thereof.

OBJECTS OF THE INVENTION

The first object of the present invention is to provide a means by which a simple, low cost, and reliable technique can be used to produce a low-density uncrosslinked polyolefinic foam which does not contain a chemical compound that has been shown to exhibit adverse effects on the stratospheric ozone concentration.

A second object of this invention to provide a means by which a simple, low cost, and reliable technique can be used to produce a low-density uncrosslinked polyolefinic foam which does not contain flammable levels of hydrocarbon compounds.

An additional object of the invention is to incorporate chemical compounds that do not adversely affect human, animal, or plant life so they these compounds can be used without sophisticated protection devices or elaborate control technology.

A further object of the invention is to produce a stable foam structure for which the physical properties will not significantly deteriorate over the course of time.

An additional object of the invention is to produce a foam material that will not adversely affect the surface characteristics of other materials that the foam may be placed in intimate contact.

BROAD DESCRIPTION OF THE INVENTION

In accordance with the aforementioned objects, this invention incorporates oxygenated hydrocarbon compounds with a structure containing multiple ether bonds, multiple hydroxyl bonds, carbonyl groups, or some combination of these three chemical structure components that will function within the extruder to decrease the minimum pressure required to prevent prefoaming at the die while retarding the collapse of foam due to excessive blowing agent migration when the primary blowing agent is carbon dioxide. In particular, the invention is directed to a method of making a polyolefinic foam composition comprising the steps of:

(a) feeding a polyolefinic polymer into an extruder;

(b) adding a nucleating agent to the resin feed;

(c) optionally adding a permeation modifier to the resin feed;

(d) plasticating the mixture in an extruder to form a polymeric melt;

(e) incorporating a blowing agent of carbon dioxide and optionally one or more members selected from the group consisting of inorganic blowing agents, organic blowing agents, and combinations thereof;

(f) incorporating at least one compatibilizing agent into said foamable composition wherein said compatibilizing agent is an oxygenated hydrocarbon that decreases the minimum pressure required to prevent prefoaming while retarding the collapse of foam due to excessive blowing agent migration;

(g) uniformly mixing and cooling the foamable composition to a temperature effective for the expansion of the polyolefinic foam; and (h) extruding or ejecting the foamable composition through a die at a sufficiently high rate to form a polyolefinic foam. The invention is also directed to a foam composition made by the above-described process.

In traditional polyolefinic foam extrusion processes, pellets of the thermoplastic resin are blended with a solid phase nucleating agent and then melted in a heated extruder where the plastic and nucleating agent combination are held under high temperature and pressure. The physical blowing agent which generally liquefies within the extruder and which will vaporize at die melt temperatures and atmospheric pressure is added to the pressurized melted material. Within the molten extrudate, the physical blowing agent tends to act as a plasticizer to reduce the viscosity and thus lowers the level of temperature necessary to maintain the hot melt condition of the mixture of thermoplastic plastic material and nucleating agent. The blowing agent is mixed with the melted plastic and nucleating agent and the combination is subsequently cooled to an extrusion temperature suitable for foaming. A permeation modifier agent which is usually an ester of a fatty acid having a chain of 16–22 carbon atoms is often also added to prevent the collapse of the resulting foam structure over time. The cooled combination is pushed through a die by the pressure gradient and when released to atmospheric pressure, the liquified physical blowing agent vaporizes and expands to form bubbles of gas at the nucleating sites established by the uniformly dispersed nucleating agent particles.

When used as physical blowing agents in traditional low density polyolefinic foam processes, carbon dioxide either alone or in combination with other gases including water, generally produces nondescript masses of polymeric material or otherwise poor quality thermoplastic foams which collapse. This lack of dimensional stability occurs because of the limited solubility for these compounds within the molten thermoplastic extrudate which results in an uncontrollable high level of open cells in the foam structure as the thermoplastic/blowing agent combination exits the die. Additionally, even if the resultant thermoplastic materials which are made with carbon dioxide, water, or blends thereof do have a visible foam structure, most of such foams tend to collapse quickly in time and become useless for most practical applications in less than 24 hours after manufacture. Accordingly, the invention is directed to oxygenated hydrocarbons, particularly those that have a carbon to oxygen ratio between about 0.5 and 1.0 in the thermoplastic/physical blowing agent blend to function to reduce the pre-foaming pressure required to make a foam at the die and subsequently either eliminate or significantly reduce the rate of collapse normally exhibited by polyolefinic foam made with carbon dioxide, water or blends thereof.

In the disclosed polyolefinic foamable composition invention, pellets of the thermoplastic resin are mixed with a solid phase nucleating agent and then melted in a heated extruder where the plastic and nucleating agent are held under high temperature and pressure as in the traditional foam process. Carbon dioxide is added to the extrudate through an injection port at the typical extruder injection zone. An auxiliary blowing agent, which may be an inorganic or organic compound, may optionally be added through the same or separate injection ports as that used for carbon dioxide.

Additionally, an oxygenated hydrocarbon compatibilizing agent is added to the foamable composition. The molecular weight of the oxygenated hydrocarbon generally determines the manner in which the oxygenated hydrocarbon is added. Oxygenated hydrocarbons which have a molecular weight above about 10,000 are mixed in solid form with the pellets of polyolefin resin. Oxygenated hydrocarbons which have a molecular weight below about 10,000 are added in the same extrusion zone either through the same injection port but preferably through a separate injection port located at some angle, generally 90° or 180° radially from the carbon dioxide injection port. The chemical structure of oxygenated hydrocarbon determines whether the oxygenated hydrocarbon is added as a pure component or as an aqueous solution in a specific concentration range. If the oxygenated hydrocarbon is to be added as a pure component, its melting point at normal atmospheric pressure determines whether the oxygenated hydrocarbon is injected in liquid or heated liquified form. Within the molten extrudate, the carbon dioxide, auxiliary blowing agents, if present, water, if present, and the oxygenated hydrocarbon all tend to act as plasticizers to reduce the melt viscosity and thus lower the level of temperature necessary to maintain the hot melt condition of the mixture of thermoplastic plastic material and nucleating agent. The carbon dioxide, auxiliary blowing agents, if present, water, if present, and the oxygenated hydrocarbon are mixed with the melted plastic and nucleating agent and the combination is subsequently cooled to an extrusion temperature suitable for foaming. The cooled combination is pushed through a die by the pressure gradient and when released to atmospheric pressure, the physical blowing agent(s) expand rapidly but at a rate lower than would if the oxygenated hydrocarbon were not present. In the area of lower pressure such as the atmosphere at ambient temperatures, the thermoplastic/oxygenated hydrocarbon/ physical blowing agent blend expands to form bubbles of the physical blowing agent gas at the nucleating sites established by the uniformly dispersed nucleating agent particles. The affinity of the oxygenated hydrocarbon for the carbon dioxide and the water, if present, also tends to slow the diffusion rate of the gas molecules from the foam structure so that the polyolefinic foam does not collapse in 24 hours or less as it would if the oxygenated hydrocarbon were not present.

DETAILED DESCRIPTION OF THE INVENTION

The term polyolefinic is meant to include polymers of linear or branched $C_2$ to $C_8$ hydrocarbon molecules that contain one double bond in its structure, including alkenes such as ethene, propene, 1-butene, 2-butene, 1-pentene, 2-pentene, 3-pentene. Preferred polyolefinic materials include polymers of ethene which are commonly known as polyethylene and polymers of propene which are commonly known as polypropylene. Broadly, the invention involves a composition and process for making a closed-cell low density polyolefinic foam having a density of 10 kg/m³ to 150 kg/m³, preferably 20 kg/m³ to 150 kg/m³.

The polyethylenic resin that can be used in the foamable composition invention can be those obtained by polymerizing ethylene, or polymerizing ethylene with other aliphatic polyolefins, such as propylene, 1-butene, 1-pentene, 3-methyl-1-butene, 4-methyl-1-pentene 4-methyl-1-hexene, or 5-methyl-1-hexene alone or mixtures thereof, or with various other polymerizable monomers.

Polyethylenic resins include hoinopolymers of ethylene and copolymers of ethylene and other ethylenically-unsaturated monomers having from three to about eight carbon atoms, propylene, butenes, pentenes, hexenes, and the like. These comonomers preferably have from three to about six carbon atoms, and most preferably have three or four carbon atoms. The copolymers can include other monomers compatible with ethylene. Particularly preferred are medium density polyethylene, low density polyethylene, and linear low polyethylene. Such polyethylenes are described in the *Kirk Othmer Encyclopedia of Chemical Technology*, Third Ed., Vol. 16, pages 385, 420, the *Modern Plastic Encyclopedia*, (1986-87), pages 52–63, and the *Encyclopedia of Polymer Science and Technology*, Vol. 7, page 610, which are incorporated herein by reference.

The term "polyethylenic resin (or material)", as used herein, is meant to include not only homopolymers of ethylene, but also ethylene copolymers composed both of at least 50 mole percent (preferably at least 70 mole percent) of a ethylene unit and a minor proportion of a monomer copolymerizable with ethylene, and blends of at least 50% percent by weight (preferably at least 60 percent by weight) of the ethylene homopolymer with another polymer.

Preferred polyethylenes include uncrosslinked, low-density polyethylene having a density of about 910 to 920 kg/m³ and a melt flow index in the range of 0.2 to 3.8 g per 10 minutes. In general, the ethylene polymer should have a melt (flow) index of less than about 10 grams per 10 minutes. The melt (flow) index (ASTM D1238) as the nominal flow rate at 190° C. and 689.5 kPa, and is expressed as grams per 10 minutes.

The propylene polymeric resin can be obtained by polymerizing propylene, or polymerizing propylene with other aliphatic polyolefins, such as, ethylene, 1-butene, 1-pentene, 3-methyl-1-butene, 4-methyl-1-pentene, 4-methyl-1-hexene, 5-methyl-1-hexene and mixtures thereof, or with various other polymerizable monomers.

The term "propylene polymeric resin (or material)", as used herein, is meant to include not only homopolymers of propylene, but also propylene copolymers composed of both at least 50 mole percent (preferably at least 70 mole percent) of a propylene unit and a minor proportion of a monomer copolymerizable with propylene, and blends of at least 50 percent by weight (preferably at least 60 percent by weight) of the propylene homopolymer with another polymer.

Also permissible are blends of propylene polymeric resin with one or more "polymeric modifiers", as used herein to include low density polyethylene (LDPE), medium density polyethylene (MDPE), high density polyethylene (HDPE), linear low density polyethylene (LDPE), polyolefin elastomers, polyolefin plastomers, saturated and unsaturated styrene-butadiene random and block copolymer rubbers, polyamides, ethylene ethyl acrylate (EEA), ethylene methyl acrylate (EMA), ethylene acrylic acid (EAA), ethylene methacrylic acid (EMAA), ethylene vinyl alcohol (EVOH), ethylene vinyl acetate (EVA), ethylene propylene diene monomer copolymer (EPDM) rubbers, and olefinic ionomers, such that the total propylene monomer units are in excess of 50 weight percent.

Preferred propylene polymer blends contain at least 50 percent by weight of "high melt strength" polypropylene which has a loss tangent less than or equal to 1.2 at 1 radian/sec frequency and 190° C., a density of about 900 to 910 kg/m³, and a melt flow index in the range of 2.2 to 3.8 g per 10 minutes. In general, the propylene polymer should have a melt (flow) index of less than about 10 grams per 10 minutes. The melt (flow) index (ASTM D1238) is the nominal flow rate at 230° C. and 298.2 kPa, and is expressed as grams per 10 minutes. A preferred high melt strength polypropylene used in the invention process has a branched molecular structure, providing increased molecular entanglement.

Permeation modifiers may be used in the foamable composition of the invention, particularly with low density polyethylene to prevent collapse of the cellular structure within about as little as ten minutes to up to about eight hours after formation. Permeation modifiers are also called aging modifiers in some polyolefinic extrusion art. Preferred permeation modifiers include octadecanamide and ethylene-bis-stearamide. The most preferred permeation modifier for use in the foamable composition invention is octadecanamide.

The nucleating agent, or cell size control agent can be any conventional or useful nucleating agent(s). The cell size agent is preferably used in amounts of 0.1 to 2.0 weight percent, depending upon the desired cell size and based upon the weight of the polyolefinic resin. Examples of the cell size control agents are inorganic materials (in small particulate form), such as clay, talc, silica, and diatomaceous earth. Additional examples include organic cell size-controlling agents which decompose or react at the heating temperature within the extrude to evolve gas, such as a combination of an alkali metal salt of a polycarboxylic acid, such as sodium hydrogen tartrate, potassium hydrogen succinate, sodium citrate, potassium, citrate, or sodium oxalate (or a polycarboxylic acid such as citric acid) with a carbonate or bicarbonate, such as sodium carbonate, sodium bicarbonate, potassium carbonate, potassium carbonate, or calcium carbonate. A combination of a monoalkali metal salt of a polycarboxylic acid, such as monosodium citrate or monosodium tartrate, with a carbonate or bicarbonate is an example. Preferred cell size control agents are talc or a stoichiometric mixture of citric acid and sodium bicarbonate (the mixture having a 1 to 100 percent concentration where the carrier is a suitable polymer such as low density polyethylene or polypropylene). Mixtures of cell size control agents can be used.

The physical blowing agent for this invention includes carbon dioxide as the primary blowing agent. Primary blowing agent in this context means that at least 50 mole percent of the total blowing agent is carbon dioxide. The carbon dioxide blowing agent can be used at a rate of 0.5 to 7.0 weight percent, but preferably 2.0 to 5.0 weight percent, of the total extruder flow rate. One or more auxiliary physical blowing agents may also be included. Permissible auxiliary blowing agents include both organic and inorganic halogen-free blowing agents and mixtures thereof. The inorganic, halogen-free blowing agents are those which are environmentally acceptable and nonflammable. The organic blowing agents are those which are environmentally acceptable, but which may be classified as flammable.

If one or more auxiliary physical blowing agents are used, the preferred auxiliary blowing agents are inorganic blowing agents which are inorganic atmospheric gases and those other compounds which are chemically non-reactive at the extruder conditions. Examples of the preferred auxiliary inorganic blowing agents include argon, nitrogen, neon, helium, krypton, nitrous oxide, and sulfur hexafluoride. The most preferred auxiliary inorganic blowing agent is argon. When one or more auxiliary blowing agents are used with carbon dioxide, they are preferably injected individually into separate injection ports, but they can be injected together into the same injection port of the mixing extruder. When the auxiliary blowing agent is argon, it is used at a rate of 0.1 to 4 weight percent (but preferably at a rate of 0.1 to 4.0 weight percent) of the total extruder flow rate so that the weight ratio of argon-to-carbon dioxide does not exceed 0.9. When the auxiliary blowing agent is nitrogen, nitrogen can be used at a rate of 0.1 to 1.5 weight percent of the total extruder flow rate so that the weight ratio of nitrogen-to-carbon dioxide does not exceed 0.4.

Although considered as a potential physical blowing agent in some prior art, the compound of water is not considered in this invention as a auxiliary blowing agent because the use of water in conjunction with certain oxygenated compounds as described herein has functionality not generally associated with physical blowing agents.

The term organic blowing agents include partially fluorinated hydrocarbons, known as HFCs', HCFCs' or CFCs'. Under current Federal laws, the use of virtually all CFCs' and HCFCs' are prohibited in products which might be made by this process and, thus, their application in the process invention would be restricted. However, HCFCs' can be used for insulation products made by this foamable composition invention.

The preferred partially fluorinated hydrocarbon blowing agents are those which have molecules which contain up to three carbon atoms and which do not contain any other halogen atoms, such as, 1,1-difluoroethane (HFC-152a), 1,1,1-trifluoroethane (HFC-143a), 1,1,1,2-tetrafluoroethane (HFC-134a), 1,1,1,2,2-pentafluoroethane (HFC-125) and 1,1,2,3,3-pentafluoropropane (HFC-245fa). The most preferred partially fluorinated hydrocarbon as an auxiliary blowing agent for this invention is HFC-134a. HFC-134a is used at a rate of 0.1 to 3.0 weight percent of the total extruder flow rate so that the weight ratio of HFC-134a-to-carbon does not exceed about 1.0.

The term "compatibilizing agent", as used herein, is meant to include those materials that are used in conjunction with either carbon dioxide blowing agent, a blend of carbon dioxide and one or more auxiliary inorganic blowing agents, a blend of carbon dioxide and one or more auxiliary organic blowing agents, or carbon dioxide and a blend of auxiliary organic and inorganic blowing agents (1) to sufficiently plasticize the thermoplastic extrudate within the extruder so as to maintain die melt temperatures sufficiently low to produce a closed cell foam structure, and (2) which will have sufficient affinity for the carbon dioxide to lower the prefoaming pressure at the die with the physical blowing agent or blowing agent blend.

The compatibilizing agent is one or more materials selected from oxygenated hydrocarbon compounds that will decrease the minimum pressure required to prevent prefoaming at the die while retarding the collapse of foam due to excessive blowing agent migration when the primary physical blowing agent is carbon dioxide. Although not specifically limited by the oxygen-to-carbon ratio, preferred oxygenated hydrocarbon compounds that having compatibilizing capability for carbon dioxide in a polyolefinic foamable composition have at least one hydroxyl bond and have an overall oxygen-to-carbon atomic ratio between about 0.5 and 1.0.

Some of the oxygenated hydrocarbons function as compatibilizing agents when used in pure component form, while others only have been found to work when the agent is used in conjunction with water, for example, as in an aqueous solution. In general, oxygenated hydrocarbons where 50% or more of the oxygen atoms are linked to carbon atoms by ether bonding such as in a polyglycol can generally function as a compatibilizing agent when added as a pure component. Oxygenated hydrocarbons where 50% or more of the oxygen atoms are linked to carbon atoms in hydroxyl group bonding such as in a polyhydric alcohol generally only function as a compatibilizing agent when supplied in an aqueous solution of 5 to 75 percent by weight.

Examples of the subclasses of oxygenated hydrocarbons that have demonstrated ability to function as compatibilizing agents when added as pure components or when water is included in the foamable composition are the polyglycols and polyglycol ethers. The polyglycol and polyglycol ethers are effective as compatibilizing agents when water is not included in the foamable composition, but lower densities can generally be reached when water is added.

Permissible polyglycols as used herein includes those that are polymers of ethylene oxide, which may have either a branched or linear molecular structure with a molecular weight of less than about 20000. Those polyglycols with a linear structure include triethylene glycol, tetraethylene glycol, pentaethylene glycol, hexaethylene glycol. The polyglycols with a branched structure are generally referred to by their average molecular weight. Preferred branched polyglycols have an average molecular weight between about 200 and 20000. The most preferred polyglycol is polyethylene glycol with an average molecular weight of about 8000, which is abbreviated here-in as "PEG-8000". The polyethylene glycol can be added at a rate of 0.1 to 2.0 weight percent of the extruder flow rate. The preferred rate is 0.5 to 1.0 weight percent of the extruder flow rate.

Permissible polyglycol ethers include $C_1$–$C_8$ monoalkyl or dialkyl ethers of those polymers of ethylene oxide, which may have either a branched or linear structure with a molecular weight of less than about 10000, preferably 200 to 5000. Those polyglycol ethers with a linear structure include tetraethylene glycol dimethyl ether, diethylene glycol dibutyl ether, and poly(ethylene glycol) dimethyl ether, as well as polymers of propylene oxide including tripropylene glycol dimethyl ether. The most preferred linear polyglycol ether is tetraethylene glycol dimethyl ether. The polyglycol ethers with a branched structure are generally referred as the methoxy ether or dimethoxy ether of a polyethylene glycol of a specific average molecular weight. The preferred branched polyglycol ethers are monomethyl ethers of polyethylene glycol that have an average molecular weight between about 350 and 5000. The most preferred branched polyglycol ether is methoxy ether of polyethylene glycol with an average molecular weight of about 5000. The polyethylene glycol ether can be added at a rate of 0.1 to 2.0 weight percent of the extruder flow rate. The preferred rate of polyglycol ether addition is 0.5 to 1.0 weight percent of the extruder flow rate.

Examples of the subclasses of oxygenated hydrocarbon that have demonstrated ability to function as compatibilizing agents only when water is included in the foamable composition are polyethylene oxides, polyglycerols, polyhydric alcohols, and polyvinyl alcohols.

Longer chain branched or linear polymers of ethylene oxide are generally referred to as polyethylene oxides which is sometime abbreviated to PEO. The polyethylene oxides permissible in the invention process have a molecular weight between about 200,000 and 1,000,000, preferably 250,000 to 350,000. The most effective means of addition of a polyethylene oxide is inclusion in the resin feed. Unlike the polyglycols or polyglycol ethers, the polyethylene oxides have been found only to function in the invention composition when water is included in the composition. The water can be added in the manner used for physical blowing agents. The most preferred polyethylene oxide for use in the invention has an average molecular weight of about 300,000. The polethylene oxide can be added at a rate of 0.1 to 2.0 weight percent of the extruder flow rate. The preferred rate of polyglycol ether addition is 0.3 to 0.7 weight percent of the extruder flow rate.

Polymers of glycerol are generally referred to as polyglycerols. Polyglycerols typically have a linear structure. The shorter chain polymers consisting of about 18 or less monomeric units should actually be classified as oligoglycerols. Unlike the polyglycol or polyglycol ethers, but similar to the polyethylene oxides, the oligoglycerols or polyglycerols have been found to function as a compatibilizing agent when water is included in the extruded foamable composition. The preferred oligoglycerols have an average molecular weight less than 800. The most effective means of addition of the oligoglycerol is in an aqueous solution. The most effective concentration range of the aqueous solution is 25 to 75 weight percent of the oligoglycerol. The most preferred concentration is 33 to 50 percent by weight of the oligoglycerol. The preferred amount of compatibilizing agent solution is 0.2 to 1.0 weight percent of the total extruder flow rate. The most preferred oligoglycerol contains 50 weight percent or more triglycerol (4,8-dioxa-1,2,6,10,1 1-undecanepentol) and has an average molecular weight of about 240.

Polyhydric alcohols are generally considered to be those oxygenated hydrocarbon molecules that have oxygen atoms bonded to carbon atoms in a given molecule only by two or more hydroxyl groups. The glycols are the common name given to a specific subclass of polyhydric alcohols which have only two hydroxyl groups. The permissible polyhydric alcohols also include fully hydroxylated linear molecules like glycerol, the erythritols, the arabitols, the xylitols, the adonitols, the sorbitols, the mannitols, the iditols, the allitols, the talitols, and perseitol. Preferred polyhydric alcohols further include non-linear compounds like pentaerythritol, and the inositols. Other polyhydric alcohols that are not fully hydroxylated, but have a carbon/oxygen ratio that is approximately unity like rhamnitol, and epifucitol are also permissible in the invention. The polyhydric alcohols have generally been found to function in the extruded foamable composition invention as compatibilizing agents only when water is present. The preferred polyhydric alcohols have three to eight carbon atoms. The most effective means of addition of the polyhydric alcohols is in an aqueous solution having a concentration range of 10 to 60 percent by weight of the polyhydric alcohol. The most preferred concentration is 50 percent by weight of the polyhydric alcohol. The preferred amount of compatibilizing agent used is 0.2 to 1.0 weight percent of the total extruder flow rate. The most preferred polyhydric alcohol is d-sorbitol (a stereoisomer of 1,2,3,4,5,6-hexanehexol).

Polyvinyl alcohols are a specific example of a longer chain polyhydroxylated polymers and are sometimes abbreviated to PVOH. Many of the commercially available polyvinyl alcohols have a linear structure and a molecular weight less than about 200,000. The preferred polyvinyl alcohols have a molecular weight between about 13,000 and 150,000. The most effective means of addition of a polyvinyl alcohol is inclusion in the resin feed. Like the polyhydric alcohols, the polyvinyl alcohols have been found only to function in the invention composition when water is included in the composition. The water can be added in the manner used for physical blowing agents. The most preferred polyvinyl alcohol for the invention process has an average molecular weight of in the range of about 13,000 to 23,000. The polyvinyl alcohol can be added at a rate of 0.04 to 2.0 weight percent of the extruder flow rate. The preferred rate of polyglycol ether addition is 0.3 to 0.7 weight percent of the extruder flow rate.

Other specific classes of oxygenated hydrocarbons which may be used as compatibilizing agents include carbohydrates which are soluble or dispersible in water including those aldoses, ketoses, monosaccharides, disaccharides, trisaccharides, oligosaccharides, and the polysaccharides.

For low density polyethylene (LDPE) foamable compositions, the most preferred compatibilizing agent for use with a physical blowing agent which is primarily carbon dioxide is an aqueous solution of an oligoglycerol of average molecular weight of about 240 and which contains at least 50 percent triglycerol. The most effective usage rate is 48 to 52 weight percent concentration aqueous solution ofthe added at 0.55 to 0.65% ofthe total extruder flow rate.

For propylene polymer foamable compositions made with high melt strength polypropylene, the most preferred compatibilizing agent for use with a physical blowing agent which is primarily carbon dioxide is an aqueous solution of a d-sorbitol. The most effective usage rate is 48 to 52 weight percent concentration aqueous solution of the added at 0.55 to 0.65% of the total extruder flow rate.

Other additives, such as, coloring agents, fire retardants, antioxidants, and plasticizers, as normally known in the art can also be included in the foamable composition.

Besides the polyolefins, the oxygenated hydrocarbons are expected to function in a foamable composition with other polymeric systems known in the art to be capable of producing foams with carbon dioxide blowing agent. Such other systems include but are not limited to polystyrene foam, polycarbonate foam, and polymethylmethacrylate foam.

Generally, the foamable composition can be made into a foam comprising the steps of:

(a) feeding a polyolefinic polymer into an extruder;

(b) adding a nucleating agent to the resin feed;

(c) optionally adding a permeation modifier to the resin feed;

(d) plasticating the mixture in an extruder to form a polymeric melt;

(e) incorporating a blowing agent of carbon dioxide and optionally one or more members selected from the group consisting of inorganic blowing agents, organic blowing agents, and combinations thereof;

(f) incorporating at least one compatibilizing agent into said foamable composition wherein said compatibilizing agent is an oxygenated hydrocarbon that decreases the minimum pressure required to prevent prefoaming while retarding the collapse of foam due to excessive blowing agent migration;

(g) uniformly mixing and cooling the foamable composition to a temperature effective for the expansion of the polyolefinic foam; and (h) extruding or ejecting the foamable composition through a die at a sufficient high rate to form a polyolefinic foam. The invention is also directed to a foam composition made by the above-described process.

In particular, the foamable invention composition has equivalent utility in both a continuous process and an intermittent process. The foamable composition with the compatibilizing agent can be used in an extrusion process operated on a continuous basis using a conventional extruder system. The continuous process for polyolefinic foams can produce foam of any thickness. The intermittent process is generally used for large cross-section polyolefinic foams with thickness greater than about 25 mm. The two processes have similar extrusion conditions but differ slightly in preferred composition.

The foamable invention composition also has utility in producing foams from those polyolefinic resins that are generally regarded as being foamable in the art by a conventional foam extrusion process. Low-Density Polyethylene (LDPE) and High Melt Strength Polypropylene are the preferred embodiment of such resins. The two resins have significantly different melting temperatures and thus different compatibilizing agents have been found to be more effective with polypropylene than polyethylene and other different compatibilizing agent have been found to be more effective with polyethylene than with polypropylene.

Finally, some of the applications for such thermoplastic polyolefinic cellular bodies require specific density ranges for attainment of prescribed physical property specifications. The use of carbon dioxide in combination with certain auxiliary blowing agents has been found to be more effective than carbon dioxide in combination with other blowing agents for producing a polyethylene foam within a specific foam density range.

Accordingly, preferred embodiments include: (1) Low Density Polyethylene (LDPE) Foam made in a Continuous Process, (2) Low Density Polyethylene (LDPE) Foam made in an Intermittent Process in the range of 10 kg/m$^3$ to about 73 kg/m$^3$, (3) Low Density Polyethylene (LDPE) Foam made in an Intermittent Process in the range of 73 kg/m$^3$ to about 150 kg/m$^3$, (4) High Melt Strength (HMS) Polypropylene Foam made in a Continuous Process, (5) High Melt Strength (HMS) Polypropylene Foam made in an Intermittent Process in the range of 10 kg/m$^3$ to about 50 kg/m$^3$.

LDPE FOAM in a CONTINUOUS PROCESS

Pellets of Low-density Polyethylene resin with density in the range of 910–920 kg/m$^3$ and a Melt Flow Index in the range of 1.8–2.2 g/10 min (ASTM Condition P) are co-fed into an extruder hopper with 0.01 to 0.05 weight percent pellets of a 20% active ingredient crystalline silica concentrate which is also based in a low-density polyethylenic material which has a Melt Flow Index that is preferably in the same range as the resin of the polyethylene pellets. Pellets of commercial grade octadecanamide are added at a rate of about 1.0 to 1.25 weight percent of the total pellet feed. The pellet blend is melted in the 48:1 L:D single screw extruder and compressed by the screw to a pressure of about 1.25 MPa. The screw is mechanically driven to rotate at a rate of 30–50 revolutions per minute depending upon the desired extruder output rate. Through one injection port which is located approximately 16 diameter lengths downstream of the extruder pellet feed throat, carbon dioxide which has been pressurized to 17.5 MPa is regulated through a control valve for delivery at about 5 to 6% of the total extruder flow rate. Through a separate injection port that is located 90° radially from the port used for carbon dioxide, 1,1,1,2-tetrafluoroethane as an auxiliary blowing agent is pumped to pressure of about 17 MPa and is subsequently regulated into the extruder at a rate of 2 to 3% of the total extruder flow rate. Through another separate injection port that is located 180° radially from the port used for carbon dioxide, a 50% by weight aqueous solution of oligoglycerol with an average molecular weight of about 239 is pumped to a pressure of about 17 MPa and is subsequently regulated into the extruder at a rate of about 0.6% of the total extruder flow rate.

Immediately downstream of the injection port, the extruder screw is equipped with a mixing section containing at least four screw-diameter lengths of multiple highly-pitched segmented flights. The physical blowing agent and the oligoglycerol/water solution are mixed in the pressurized melted material in the mixing zone.

The barrel temperatures of the four or more extruder zones of the single screw extruder subsequent to the injection zone are decreased in increments to deliver an extrusion melt temperature in the range of 105°–115° C. to the head of the extruder at a pressure of 9.3 to 10.0 MPa if an optional gear pump is present or 15 to 17 MPa if there is no gear pump.

The pressurized melt is delivered to an annular foam die with an exit angle of 40–50° and die lands with a converging angle of 3° to 5°. The cooled polyethylene/carbon dioxide/oligoglycerol/water combination extrudes through the die to atmospheric pressure and most of the physical blowing agent expands rapidly to form bubbles at the nucleating sites established by the nucleating agent particles.

Example 1 details the preferred embodiment of the invention for LDPE in the continuous process. Example 2 shows what happens when the compatibilizing agent is removed. Example 3 shows the results of an alternative compatibilizing agent with LDPE in a continuous process.

INTERMITTENT PROCESS for LARGE CROSS-SECTION LDPE FOAM in DENSITY RANGE OF 10 kg/m³ to ABOUT 73 kg/m³.

Pellets of Low-density Polyethylene resin with density in the range of 910–920 kg/m³ and a Melt Flow Index in the range of 1.8–2.2 g/10 min (ASTM Condition P)are co-fed into an extruder hopper with 5–6 weight percent pellets of a 20% active ingredient crystalline silica concentrate which is also based in a low-density polyethylenic material which has a Melt Flow Index that is preferably in the same range as the resin of the polyethylene pellets. Pellets of commercial grade octadecanamide are added at a rate of about 1.0 to 1.25 weight percent of the total pellet feed. The pellet blend is melted in the 32:1 L:D single screw extruder and compressed by the screw to a pressure of about 12.5 MPa. Through one injection port which is located approximately 16 diameter length downstream of the extruder pellet feed throat, carbon dioxide which has been pressurized to 1.75 MPa is regulated through a control valve for delivery at about 2 to 4% of the total extruder flow rate. Through a separate injection port that is located 90° radially from the port used for carbon dioxide, 1,1,1,2-tetrafluoroethane which has been separately pressurized to 17.5 MPa is regulated through a separate control valve for delivery at about 2 to 4% of the total extruder flow rate. Through a third injection port that is located 270° radially from the port used for carbon dioxide, an 50 percent by weight aqueous solution of an oligoglycerol of average molecular weight of 239 and containing at least 50% triglycerol is pumped to a pressure of about 17.5 MPa is regulated into the extruder at a rate of about 0.6% of the total extruder flow rate.

Immediately downstream of the injection port, the extruder screw is equipped with a mixing section containing at least four screw-diameter lengths of multiple highly-pitched segmented flights. The carbon dioxide, 1,1,1,2-tetrafluoroethane, and aqueous oligoglycerol solution are mixed into the pressurized melted material in the mixing zone. The molten extrudate is compressed in the final stages of the extruder to 14.1 to 14.5 MPa and is subsequently fed through a heated pipe into a secondary extruder.

The secondary extruder is any one that has been specifically designed to accept molten polymer feeds and should have a flighted screw length equivalent to at least 24 of its screw diameters with equivalence to 32 diameters being the preferred length. The ratio of the screw diameter of the secondary extruder to the screw diameter of the first extruder should preferably be in the 1.25 to 1.4 range. The preferred screw design for optimal melt cooling has four parallel flights radially spaced by 90° with cross-cut segment with a length about ⅓ of the screw diameter missing from each flight with a repeat length equivalent to four screw diameters.

In the secondary extruder, the extruder barrel temperatures are maintained to deliver a melt temperature in the range of 90° to 115° with 108° C. as the ideal melt temperature. The pressure at the head of the extruder should be maintained at 9.3 to 11.3 MPa if an optional gear pump is present or will be about 17.5 to 19.5 MPa if there is no gear pump.

The cooled pressurized molten mixture of polyethylene, carbon dioxide, 1,1,1,2-tetrafluoroethane, and aqueous oligoglycerol solution is pumped through a pipe through into a hydraulic-pressurized piston chamber which is set to maintain a melt pressure of about 12.4 MPa. The various zones of the chamber are externally cooled by forced convection air to the range of 99° to 105° C.

The specific details ofthe piston process are discussed in U.S. Pat. No. 4,323,528. In summary, as the volume of the molten mixture fills the piston chamber, the piston plunger wall moves. When the piston moves a predefined distance, a switch actuates the drive system and the gate system for the cylinder. For the current discussed process, the drive mechanism is set to move the plunger at a predefined speed so as to dispel the material through the radial die at a rate of about 2350 kg/hr. The discharged material expands rapidly in all three directions as it leaves the die, but is captured on a conveyor table equipped to move the expanded mass sufficiently to clear the die and to control the expansion of the material in the thickness and machine directions. The resulting foam block in left in the table long enough for the next advance of the plunger. The foam block is placed upon additional cooling racks and allowed to cool sufficiently for handling, typically 15 minutes. Example 4 details the preferred embodiment of the invention for the intermittent process that can produce large cross section polyethylene foam.

INTERMITTENT PROCESS for LARGE CROSS-SECTION LDPE FOAM in DENSITY RANGE OF 10 kg/m³ to ABOUT 73 kg/m³.

Pellets of Low-density Polyethylene resin with density in the range of 910–920 kg/m³ and a Melt Flow Index in the range of 1.8–2.2 g/10 min (ASTM Condition P) are co-fed into an extruder hopper with 5–6 weight percent pellets of a 20% active ingredient crystalline silica concentrate which is also based in a low-density polyethylenic material which has a Melt Flow Index that is preferably in the same range as the resin of the polyethylene pellets. Pellets of commercial grade octadecanamide are added at a rate of about 1.0 to 1.25 weight percent of the total pellet feed. The pellet blend is melted in the 32:1 L:D single screw extruder and compressed by the screw to a pressure of about 1.25 MPa. Through one injection port which is located approximately 16 diameter length downstream of the extruder pellet feed throat, carbon dioxide which has been pressurized to 1.75 MPa is regulated through a control valve for delivery at about 2 to 4% of the total extruder flow rate. Through a separate injection port that is located 90° radially from the port used for carbon dioxide, argon which has been separately pressurized to 17.5 MPa is regulated through a separate control valve for delivery at about 2 to 4% of the total extruder flow rate. Through a third injection port that is located 270° radially from the port used for carbon dioxide, an 50 percent by weight aqueous solution of an oligoglycerol of average molecular weight of 239 and containing at least 50% triglycerol is pumped to a pressure of about 17.5 MPa is regulated into the extruder at a rate of about 0.6% of the total extruder flow rate.

Immediately downstream of the injection port, the extruder screw is equipped with a mixing section containing at least four screw-diameter lengths of multiple highly-pitched segmented flights. The carbon dioxide, argon, and oligoglycerol solution are mixed into the pressurized melted material in the mixing zone. The molten extrudate is compressed in the final stages of the extruder to 14.1 to 14.5 MPa and is subsequently fed through a heated pipe into a secondary extruder.

The secondary extruder is any one that has been specifically designed to accept molten polymer feeds and should have a flighted screw length equivalent to at least 24 of its screw diameters with equivalence to 32 diameters being the preferred length. The ratio of the screw diameter of the secondary extruder to the screw diameter of the first extruder should preferably be in the 1.25 to 1.4 range. The preferred screw design for optimal melt cooling has four parallel flights radially spaced by 90° with cross-cut segment with a length about ⅓ of the screw diameter missing from each flight with a repeat length equivalent to four screw diameters.

In the secondary extruder, the extruder barrel temperatures are maintained to deliver a melt temperature in the range of 90° to 115° with 108° C. as the ideal melt temperature. The pressure at the head of the extruder should be maintained at 9.3 to 11.3 MPa if an optional gear pump is present or will be about 17.5 to 19.5 MPa if there is no gear pump.

The cooled pressurized molten mixture of polyethylene, carbon dioxide, 1,1,1,2-tetrafluoroethane, and aqueous oligoglycerol solution is pumped through a pipe through into a hydraulic-pressurized piston chamber which is set to maintain a melt pressure of about 12.4 MPa. The various zones of the chamber are externally cooled by forced convection air to the range of 99° to 105° C.

The specific details of the piston process are discussed in U.S. Pat. No. 4,323,528. In summary, as the volume of the molten mixture fills the piston chamber, the piston plunger wall moves. When the piston moves a predefined distance, a switch actuates the drive system and the gate system for the cylinder. For the current discussed process, the drive mechanism is set to move the plunger at a predefined speed so as to dispel the material through the radial die at a rate of about 2350 kg/hr. The discharged material expands rapidly in all three directions as it leaves the die, but is captured on a conveyor table equipped to move the expanded mass sufficiently to clear the die and to control the expansion of the material in the thickness and machine directions. The resulting foam block in left in the table long enough for the next advance of the plunger. The foam block is placed upon additional cooling racks and allowed to cool sufficiently for handling, typically 15 minutes.

Example 3 details the preferred embodiment of the invention for the intermittent process that can produce large cross section polyethylene foam in the density range of 73 kg/m³ to 100 kg/m³. Example 4 provides a description of an alternative composition that produced large cross-section foam with tetraethylene glycol dimethyl ether, carbon dioxide, and argon. Example 5 shows the results when the polyglycol ether was removed from the process under the conditions of Example 4.

HMS POLYPROPYLENE FOAM in a CONTINUOUS PROCESS

Pellets of high melt strength polypropylene resin having a density in the range of 900 to 910 kg/m³ and a Melt Flow Index in the range of 2.0 to 4.0 g/10 min (ASTM Condition L) are co-fed into an extruder hopper with 0.5 to 2.0 weight percent pellets of a nominal 20 percent active ingredient crystalline silica concentrate which is based in a low-density polyethylene. The pellet blend is melted in the 48:1 L:D single screw extruder and compressed by the screw to a pressure of about 1.25 MPa. The screw is mechanically driven to rotate at a rate of 30–50 revolutions per minute depending upon the desired extruder output rate. Through one injection port which is located approximately 16 diameter lengths downstream of the extruder pellet feed throat, carbon dioxide which has been pressurized to 17.5 MPa is regulated through a control valve for delivery at about 5 to 6% of the total extruder flow rate. Through another separate injection port that is located 180° radially from the port used for carbon dioxide, a 50% by weight aqueous solution of d-sorbitol with an average molecular weight of about 239 is pumped to a pressure of about 17 MPa and is subsequently regulated into the extruder at a rate of about 0.6% of the total extruder flow rate.

Immediately downstream of the injection port, the extruder screw is equipped with a mixing section containing at least four screw-diameter lengths of multiple highly-pitched segmented flights. The physical blowing agent and the d-sorbitol/water solution are mixed in the pressurized melted material in the mixing zone.

The barrel temperatures of the four or more extruder zones of the single screw extruder subsequent to the injection zone are decreased in increments to deliver an extrusion melt temperature in the range of 105°–115° C. to the head of the extruder at a pressure of 9.3 to 10.0 MPa if an optional gear pump is present or 15 to 17 MPa if there is no gear pump.

The pressurized melt is delivered to an annular foam die with an exit angle of 40–50° and die lands with a converging angle of 3° to 5°. The cooled polyethylene/carbon dioxide/oligoglycerol/water combination extrudes through the die to atmospheric pressure and most of the physical blowing agent expands rapidly to form bubbles at the nucleating sites established by the nucleating agent particles.

Example 6 details the preferred embodiment of the invention for the continuous process.

HMS POLYPROPYLENE FOAM in a INTERMITTENT PROCESS for LARGE CROSS-SECTION FOAM in DENSITY RANGE OF 10 kg/m³ to ABOUT 73 kg/m³

Pellets of high melt strength polypropylene resin having a density in the range of 900 to 910 kg/m³ and a Melt Flow Index in the range of 2.0 to 4.0 g/10 min (ASTM Condition L) are co-fed into an extruder hopper with 0.5 to 2.0 weight percent pellets of a nominal 20 percent active ingredient crystalline silica concentrate which is based in a low-density polyethylene. The pellet blend is melted in a 32:1 L:D (i.e., length:diameter) single screw extruder, and is compressed by the screw to a pressure of about 1.25 MPa. Through one injection port, which is located approximately 16 diameter lengths downstream of the extruder pellet feed throat, carbon dioxide which has been pressurized to 17.5 MPa is regulated through a control valve for delivery at about 3 to 6 percent of the total extruder flow rate, depending upon the target density. An aqueous solution containing 50 weight percent of d-sorbitol is pressurized and regulated into the extruder at a rate of about 0.6% percent of the total extruder flow rate through a separate injection port which is located either 90° or 180° radially from the port used for carbon dioxide.

Immediately downstream of the injection port, the extruder screw is equipped with a mixing section containing at least four screw-diameter lengths of multiple, highly-pitched, segmented flights. The carbon dioxide, water, and the d-sorbitol are mixed into the pressurized melted material in the mixing zone. The molten extrudate is compressed in the final stages of the extruder to 14.1 to 14.5 MPa and, subsequently, is fed through a heated pipe into a secondary extruder.

The secondary extruder is any one which has been specifically designed to accept molten polymer feeds. It should have a flighted screw length equivalent to at least 24 of its screw diameters, with equivalence to 32 diameters being the preferred length. The ratio of the screw diameter of the secondary extruder to the screw diameter of the first extruder preferably should be greater than 1.25. The preferred screw design for optimal melt cooling has four parallel flights radially spaced by 90°, with a cross-cut segment with a length of about one-third of the screw diameter missing from each flight and with a repeat length equivalent to four screw diameters.

In the secondary extruder, the extruder barrel temperatures are maintained to deliver a melt temperature in the range of 150° C. to 170° C., with the ideal melt temperature depending upon the propylene polymer blend employed. The pressure at the head of the extruder should be maintained at 9.3 to 11.3 MPa if an optional gear pump is present, or it will be at about 17.5 to 19.5 MPa if there is no gear pump present.

The cooled, pressurized molten mixture of propylene polymer, carbon dioxide, water, and d-sorbitol is pumped through a pipe into a hydraulically-pressurized piston chamber which is set to maintain a melt pressure of about 12.4 MPa. The various zones of the chamber are externally cooled by forced convection air to the range of 160° to 165° C.

The specific details of the piston process are discussed in U.S. Pat. No. 4,323,528. In summary, as the volume of the molten mixture fills the piston chamber, the piston plunger moves. When the piston plunger moves a predefined distance, a switch actuates both the drive system and the gate system for the cylinder. For the invention process, the drive mechanism is set to move the plunger at a predefined speed, so as to dispel the material through the radial die at a rate of about 7000 kg/hr. The discharged material expands rapidly in all three directions as it leaves the die, but is captured on a conveyor table equipped to move the expanded mass sufficiently both to clear the die and to control the expansion of the material in the thickness and machine directions. The resultant foam block is left in the table long enough for the next advance of the plunger. The foam block is placed upon additional cooling racks and allowed to cool sufficiently for handling, typically for 15 minutes to one hour.

The following examples are provided for illustrative purposes only, and the invention described herein should not be considered limited thereto.

EXAMPLE 1

This example embodies LDPE foam made in a continuous process using a foamable composition that contains an oligoglycerol of average molecular weight of about 239 as the compatibilizing agent. Pellets of Westlake Polyethylene 606 are co-fed with 1.0 weight percent of pellets of Witco Kemamide (octadecanamide) and 0.08 weight percent of pellets of Schulman F20V crystalline silica into a modified 32:1 L:D Berlyn 2.5-inch (64 mm) single-screw extruder operating with a screw speed of 42–46 rpm. Commercial-grade 99.8% purity carbon dioxide which has been pressurized is injected at a pressure of about 13.1 MPa at a rate of 1.9 kg/hr. E. I. DuPont de Nemours Formacel Z-4 (1,1,1,2-tetrafluoroethane) which has been pressurized is injected at a pressure of about 13.1 MPa at a rate of 1.04 kg/hr through a separate injection port 90° radially from the port used for carbon dioxide. An 33.3% by weight aqueous solution of Hexagon Enterprises Hexapol G-3 (an oligoglycerol having an average molecular weight of about 239 and a typical triglycerol content of about 51%) which has been prepared from city water is pressurized and injected at a pressure of about 13.1 MPa at a rate of about 0.27 kg/hr through a separate injection port 180° radially from the port used for carbon dioxide. The multi-component polymer mixture is subsequently pressurized to 17.1 MPa at the extruder discharge an transfer through a heated pipe to a second larger 3.5-inch (89 mm) single screw cooling extruder. The mixture is cooled in the cooling extruder to a melt temperature of 89° C. and subsequently pressurized to 12.2 MPa at the extruder discharge. The extruder head pressure is regulated by a Normag 2200 gear pump system. The pressurized molten polymer mixture is delivered through an annular die equipped with 3-inch (76 mm) diameter die lips. The die gap is closed sufficiently to generate a die entry pressure of about 9.7 MPa. The extruder output is about 37 kg/hr. The hot foam is drawn over a water-cooled hollow-tube mandrel and the outside surface is cooled by forced convection air from a portable multi-holed ring. The draw rate is controlled by an S-configuration pull roll. The foam sheet is subsequently collected at a downstream winder. Samples of the foam sheet are weighed and the sheet thickness is measured immediately. Samples taken fresh from the winder have a thickness of 1.93 mm and a density of 45 kg/m$^3$. Two days later, the same sample of foam has a thickness of 2.02 mm and a density of 43 Kg/m$^3$.

EXAMPLE 2

This example illustrates the compatibilizing effect of the oligoglycerol/water mixture by a temporary deletion from the extrudable composition. During a trial run using the formulation of Example 1, the supply canister of Hexapol G-3/water mixture ran empty. Almost immediately after the mixture flow stopped, the polymeric material coming through the die lips became an open cell structure with gas randomly exiting the molten mass and the extruder pressures began fluctuating wildly. When the flow of the Hexapol G-3/water mixture was restored, the extrusion line quickly returned to stable operating conditions, and produced foam equivalent to that made immediately before the process upset.

EXAMPLE 3

This example is similar to Examples 1 but uses a solution of 40 weight percent d-sorbitol in city water as the compatibilizing agent. The sorbitol solution is injected at the same rate as that used for the Hexapol G-3 of Example 1 and other component rates are kept the same. In this case, samples taken fresh from the winder have a thickness of 1.68 mm and a density of 54 kg/m$^3$. The samples exhibit thinner caliper within the hour after production but returns the next day to the original density.

EXAMPLE 4

This example embodies thick cross section LDPE foam made in a intermittent process using a foamable composition that contains an oligoglycerol of average molecular weight of about 239 as the compatibilizing agent. Pellets of Westlake Polyethylene 606 are co-fed with 1.4 weight percent of pellets of Akzo Nobel Armoslip 18 (octadecanamide) and about 0.08 weight percent of pellets of Schulman F20V crystalline silica into a 48:1 L:D Wilmington 3-inch (76 mm) single-screw extruder operating with a screw speed of 36-37 rpm. Commercial-grade 99.8% purity carbon dioxide which has been pressurized is injected at a pressure of about 13.1 MPa at a rate of 0.68 kg/hr. E. I. DuPont de Nemours Formacel Z-4 (1,1,1,2-tetrafluoroethane) which has been pressurized is injected at a pressure of about 13.1 MPa at a rate of 1.22 kg/hr through a separate injection port 90° radially from the port used for carbon dioxide. A 50 weight percent aqueous solution of Hexagon Enterprises Hexapol G-3 which has been prepared from city water is pressurized and injected at a pressure of about 13.1 MPa at a rate of about 0.27 kg/hr through a separate injection port 180° radially from the port used for carbon dioxide. The multi-component mixture is cooled in the extruder to a melt temperature of 107° C. and subsequently pressurized to 15.9 MPa at the extruder discharge. The extruder head pressure is regulated by a Normag 2200 gear pump system. The melt pump increases the pressure of the melt to 18.3 MPa for delivery into the cooled hydraulically pressurized piston chamber. When the fill of the material moves the piston to a predefined distance, a switch actuates the drive system and the gate system for the cylinder to dispel the material through the radial die at a rate of about 5338 kg/hr. Samples of the resulting foam block have a fresh density of 30.9 kg/m$^3$.

EXAMPLE 5

In this example, the Example 4 compatibilizing agent of 50 weight percent aqueous solution of the oligoglycerol is replaced by a 7.5 weight percent aqueous solution of Air Products Airvol 103, a polyvinyl alcohol that has an average molecular weight between about 13,000 and 23,000. Problems with the pumping system for the aqueous polyvinyl alcohol solution delay its introduction into the extruder. Prior to the injection of the solution, the extruder is operating with the other components at concentrations similar to that of the Example 4 formulation sans the oligoglycerol solution and producing nondescript masses of polymer at the die. Upon stabilization of the aqueous polyvinyl alcohol solution flow rate at about 0.23 kg/hr, a foam begins forming which has a fresh density of 31.2 kg/m$^3$.

EXAMPLE 6

This example embodies thick cross section LDPE foam made with an intermittent process in the higher density range than that of example 4. This foamable composition also contains an oligoglycerol of average molecular weight of about 239 as the compatibilizing agent, but the auxiliary blowing agent is changed from 1,1,1,2-tetrafluoroethane to 99.998% purity commercial grade argon. Pellets of Westlake Polyethylene 606 and mixed with Schulman F20V crystalline talc concentrate based in low density polyethylene are heated in a modified 32:1 L:D Berlyn 2.5-inch (63.5 mm) single-screw extruder operating with a screw speed of 38–42 rpm. Commercial-grade 99.8% purity carbon dioxide which has been pressurized is injected at a pressure of about 13.1 MPa at a rate of 0.91 kg/hr. Commercial-grade 99.998% purity argon which has been pressurized is also injected through a separate injection port at a rate of 0.91 kg/hr. A 50 weight percent aqueous solution of Hexagon Enterprises Hexapol G-3 which has been prepared from city water is pressurized and injected at a pressure of about 13.1 MPa at a rate of about 0.27 kg/hr through a separate injection port 90° radially from the port used for carbon dioxide. The five-component mixture is subsequently pressurized to 14.3 MPa at the extruder discharge an transfer through a heated pipe to a second larger 3.5-inch (89 mm) single screw cooling extruder. The mixture is cooled in the cooling extruder to a melt temperature of about 107° C. at 4.1 MPa. The secondary extruder head pressure is regulated by a Normag 2200 gear pump system. The melt pump increases the pressure of the melt to 18.3 MPa for delivery into the cooled hydraulically pressurized piston chamber. When the fill of the material moves the piston to a predefined distance, a switch actuates the drive system and the gate system for the cylinder to dispel the material through the radial die at a rate of about 2350 kg/hr. Samples of the resulting foam block have a fresh density of 79.8 kg/m$^3$.

EXAMPLE 7

This example embodies HMS polypropylene foam made in a continuous process using a foamable composition that contains an oligoglycerol of average molecular weight of about 239 as the compatibilizing agent. Pellets of Montell PF814 Polypropylene are co-fed with about 0.08 weight percent of pellets of Schulman F20V crystalline silica into a modified 32:1 L:D Berlyn 2.5-inch (64 mm) single-screw extruder operating with a screw speed of 58–62 rpm. Commercial-grade 99.8% purity carbon dioxide which has been pressurized is injected at a pressure of about 19.3 MPa at a rate of 1.6 kg/hr. A 50 percent by weight aqueous solution of Hexagon Enterprises Hexapol G-3 which has been prepared from city water is pressurized and injected at a pressure of about 19.3 MPa at a rate of about 0.18 kg/hr through a separate injection port 180° radially from the port used for carbon dioxide. The multi-component polymer mixture is subsequently pressurized to 15.9 MPa at the extruder discharge an transfer through a heated pipe to a second larger 3.5-inch (89 mm) single screw cooling extruder. The mixture is cooled in the cooling extruder to a melt temperature of 143° C. and subsequently pressurized to 6.9 MPa at the extruder discharge. The extruder head pressure is regulated by a Normag 2200 gear pump system. The pressurized molten polymer mixture is delivered through an annular die equipped with 3-inch (76 mm) diameter die lips. The die gap is closed sufficiently to generate a die entry pressure of about 8.7 MPa. The extruder output is about 41 kg/hr. The hot foam is drawn over a water-cooled hollow-tube mandrel and the outside surface is cooled by forced convection air from a portable multi-holed ring. The draw rate is controlled by an S-configuration pull roll. The foam sheet is subsequently collected at a downstream winder. Samples of the foam sheet are weighed and the sheet thickness is measured immediately. Samples taken fresh from the winder have a thickness of 0.99 mm and a density of 69 kg/m$^3$.

EXAMPLE 8

This example embodies thick cross section HMS polypropylene foam made in a intermittent process using a foamable composition that contains d-sorbitol as the compatibilizing agent. Pellets of Montell PF814 Polypropylene are co-fed with about 0.08 weight percent of pellets of Techmer T-1901 Talc concentrate Schulman into a 48:1 L:D Wilmington 3-inch (76 mm) single-screw extruder operating with a screw speed of 36–37 rpm. Commercial-grade 99.8% purity carbon dioxide which has been pressurized is injected at a pressure of about 13.1 MPa at a rate of 1.13 kg/hr. A 50 weight percent aqueous solution of SPI Polyols Crystalline Sorbitol 712 which has been prepared from city water is pressurized and injected at a pressure of about 13.1 MPa at a rate of about 0.27 kg/hr through a separate injection port 180° radially from the port used for carbon dioxide. The multi-component mixture is cooled in the extruder to a melt temperature of 107° C. and subsequently pressurized to 15.9

MPa at the extruder discharge. The extruder head pressure is regulated by a Normag 2200 gear pump system. The melt pump increases the pressure of the melt to 18.3 MPa for delivery into the cooled hydraulically pressurized piston chamber. When the fill of the material moves the piston to a predefined distance, a switch actuates the drive system and the gate system for the cylinder to dispel the material through the radial die at a rate of about 7800 kg/hr. Samples of the resulting foam block have a fresh density of 25.6 kg/m$^3$.

EXAMPLE 9

The following table shows alternative compatibilizing agents for HMS polypropylene foam made in a intermittent process and the effective lower density limit using a sole blowing agent of carbon dioxide. The lower density is the point where additional blowing agent results in increased density due to matrix collapse.

| COMPATIBILIZING AGENT | LOWER DENSITY LIMIT (kg/m$^3$) |
|---|---|
| None | 56.1 |
| Union Carbide Carbowax 800 | 43.2 |
| 50% Hexapol G-3/Water | 30.8 |
| d-Sorbitol/Water | 23.3 |

What is claimed is:

1. A method of making a polypropylene foam comprising the steps of:
   a. feeding a polypropylene polymer into an extruder;
   b. adding a nucleating agent to the polymer feed;
   c. optionally adding a permeation modifier to the polymer feed;
   d. plasticating the mixture in an extruder to form a polymeric melt;
   e. incorporating a blowing agent of carbon dioxide and optionally one or more members selected from the group consisting of inorganic blowing agents, organic blowing agents, and combinations thereof;
   f. incorporating di-sorbitol as an oxygenated hydrocarbon that decreases the minimum pressure required to prevent prefoaming while retarding the collapse of foam due to excessive blowing agent migration;
   g. uniformly mixing and cooling the foamable composition to a temperature effective for the expansion of the polypropylene foam; and
   h. extruding or ejecting the foamable composition through a die to form a polypropylene foam, wherein said foam has a density of between 10 kg/m$^3$ to 150 kg/m$^3$.

2. The method of making a foam composition of claim 1, wherein said polyvinyl alcohol has a molecular weight of less than about 200,000.

3. The method of making a foam composition of claim 2, wherein said polyvinyl alcohol has a molecular weight of between about 13,000 and 150,000.

4. The method of making a foam composition of claim 3, wherein said polyvinyl alcohol has a molecular weight of between about 13,000 and 23,000.

5. A method of making a polypropylene foam comprising the steps of:
   a. feeding a polypropylene polymer into an extruder;
   b. adding a nucleating agent to the polymer feed;
   c. optionally adding a permeation modifier to the polymer feed;
   d. plasticating the mixture in an extruder to form a polymeric melt;
   e. incorporating a blowing agent of carbon dioxide and optionally one or more members selected from the group consisting of inorganic blowing agents, organic blowing agents, and combinations thereof;
   f. incorporating polyvinylalcohol as an oxygenated hydrocarbon that decreases the minimum pressure required to prevent prefoaming while retarding the collapse of foam due to excessive blowing agent migration and water is included in the foam composition;
   g. uniformly mixing and cooling the foamable composition to a temperature effective for the expansion of the polypropylene foam; and
   h. extruding or ejecting the foamable composition through a die to form a polypropylene foam, wherein said foam has a density of between 10 kg/m$^3$ to 150 kg/m$^3$.

6. A method of making a polypropylene foam comprising the steps of:
   a. feeding a polypropylene polymer into an extruder;
   b. adding a nucleating agent to the polymer feed;
   c. optionally adding a permeation modifier to the polymer feed;
   d. plasticating the mixture in an extruder to form a polymeric melt;
   e. incorporating a blowing agent of carbon dioxide and optionally one or more members selected from the group consisting of inorganic blowing agents, organic blowing agents, and combinations thereof;
   f. incorporating a carbohydrate soluble or dispersible in water as an oxygenated hydrocarbon that decreases the minimum pressure required to prevent prefoaming while retarding the collapse of foam due to excessive blowing agent migration;
   g. uniformly mixing and cooling the foamable composition to a temperature effective for the expansion of the polypropylene foam; and
   h. extruding or ejecting the foamable composition through a die to form a polypropylene foam, wherein said foam has a density of between 10 kg/m$^3$ to 150 kg/m$^3$.

7. The method of claim 6, wherein said carbohydrate is aldose, ketose, monosaccharide, disaccharide, trisaccharide, oligosaccharide or polysaccharide.

8. A method of making a polyethylene foam comprising the steps of:
   a. feeding a polyethylene polymer into an extruder;
   b. adding a nucleating agent to the polymer feed;
   c. optionally adding a permeation modifier to the polymer feed;
   d. plasticating the mixture in an extruder to form a polymeric melt;
   e. incorporating a blowing agent of carbon dioxide and optionally one or more members selected from the group consisting of inorganic blowing agents, organic blowing agents, and combinations thereof;
   f. incorporating di-sorbitol as an oxygenated hydrocarbon that decreases the minimum pressure required to prevent prefoaming while retarding the collapse of foam due to excessive blowing agent migration;
   g. uniformly mixing and cooling the foamable composition to a temperature effective for the expansion of the polyethylene foam; and
   h. extruding or ejecting the foamable composition through a die to form a polyethylene foam, wherein said foam has a density of between 10 kg/m$^3$ to 150 kg/m$^3$.

9. A method of making a polyethylene foam comprising the steps of:

a. feeding a polyethylene polymer into an extruder;

b. adding a nucleating agent to the polymer feed;

c. optionally adding a permeation modifier to the polymer feed;

d. plasticating the mixture in an extruder to form a polymeric melt;

e. incorporating a blowing agent of carbon dioxide and optionally one or more members selected from the group consisting of inorganic blowing agents, organic blowing agents, and combinations thereof;

f. incorporating polyvinylalcohol as an oxygenated hydrocarbon that decreases the minimum pressure required to prevent prefoaming while retarding the collapse of foam due to excessive blowing agent migration and water is included in the foam composition;

g. uniformly mixing and cooling the foamable composition to a temperature effective for the expansion of the polyethylene foam; and h. extruding or ejecting the foamable composition through a die to form a polyethylene foam, wherein said foam has a density of between 10 kg/m$^3$ to 150 kg/m$^3$.

10. The method of making a foam composition of claim 9, wherein said polyvinyl alcohol has a molecular weight of less than about 200,000.

11. The method of making a foam composition of claim 10, wherein said polyvinyl alcohol has a molecular weight of between about 13,000 and 150,000.

12. The method of making a foam composition of claim 11, wherein said polyvinyl alcohol has a molecular weight of between about 13,000 and 23,000.

13. A method of making a polyethylene foam comprising the steps of:

a. feeding a polyethylene polymer into an extruder;

b. adding a nucleating agent to the polymer feed;

c. optionally adding a permeation modifier to the polymer feed;

d. plasticating the mixture in an extruder to form a polymeric melt;

e. incorporating a blowing agent of carbon dioxide and optionally one or more members selected from the group consisting of inorganic blowing agents, organic blowing agents, and combinations thereof;

f. incorporating a carbohydrate soluble or dispersible in water as an oxygenated hydrocarbon that decreases the minimum pressure required to prevent prefoaming while retarding the collapse of foam due to excessive blowing agent migration;

g. uniformly mixing and cooling the foamable composition to a temperature effective for the expansion of the polyethylene foam; and h. extruding or ejecting the foamable composition through a die to form a polyethylene foam, wherein said foam has a density of between 10 kg/m$^3$ to 150 kg/m$^3$.

14. The method of claim 13, wherein said carbohydrate is aldose, ketose, monosaccharide, disaccharide, trisaccharide, oligosaccharide or polysaccharide.

* * * * *